Feb. 25, 1964  G. E. LIGHTNER  3,121,911
FOAMED RESIN EXTRUSION PROCESS AND APPARATUS
Filed March 8, 1961
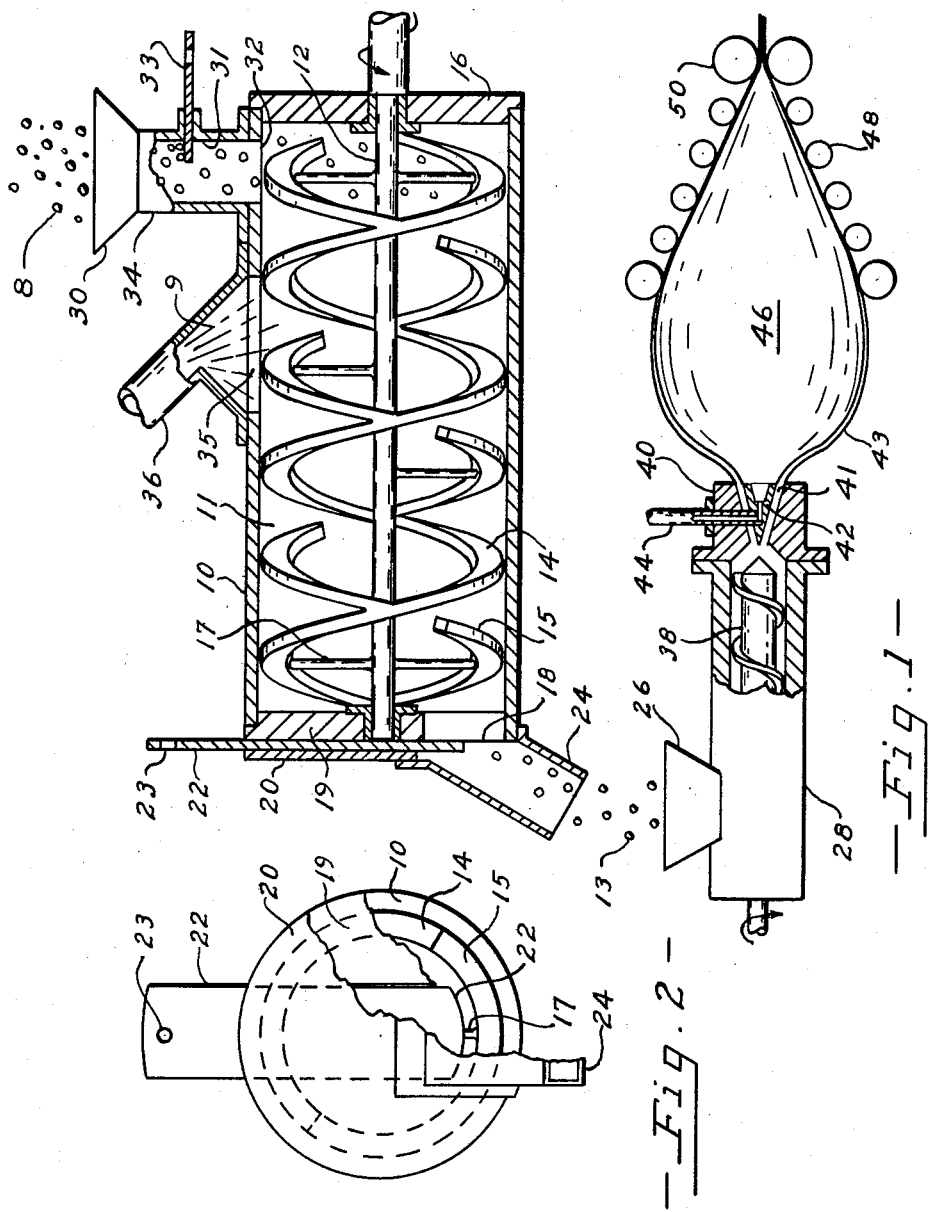
GENE E. LIGHTNER  INVENTOR.
BY Richard L. Kelly
ATTORNEY.

United States Patent Office 3,121,911
Patented Feb. 25, 1964

3,121,911
FOAMED RESIN EXTRUSION PROCESS AND APPARATUS
Gene E. Lightner, Moscow, Idaho, assignor to Monsanto Chemical Company, St. Louis, Mo., a corporation of Delaware
Filed Mar. 8, 1961, Ser. No. 94,184
9 Claims. (Cl. 18—2)

The present invention relates to a method for preparing extruded foamed thermoplastic resins and to an extrusion apparatus used in conjunction therewith.

Foamed thermoplastic resins constitute a valuable class of materials, which are finding an increasingly wide application in the fabrication of numerous consumer and industrial articles. A widely and commonly used method for fabricating articles of foamed thermoplastic resins consists of extruding resin particles which have dispersed throughout and incorporated therein a liquid foaming agent. The foaming agent employed is usually incorporated in the resin particles at the time of manufacture. This intermediate raw material is then shipped to the ultimate manufacturer of extruded articles. In the normal chain of events, as described, several troublesome problems are forever present. First is the costly and difficult process of preparing foamable thermoplastic resin particles having the desired quantity of foaming agent dispersed throughout the resin particles. Secondly, the handling and storage of such foamable resin particles presents a potential fire hazard due to the volatile nature of the foaming agent employed. Thirdly, during storage, the foamable resin particles lose a portion of the volatile foaming agent, which loss results in erratic extrusion results thereby adversely affecting the quality of the finished article.

It is an object of this invention to provide a process for continuously preparing and extruding foamable thermoplastic resins.

Another object of this invention is to provide an apparatus in which to carry out the continuous process.

Other objects and advantages of this invention will become apparent from the following detailed description thereof when read in conjunction with the attached drawing in which:

FIG. 1 is a side view, partially in section, of one embodiment of the apparatus of this invention, and FIG. 2 is an end view of the apparatus of FIG. 1 with certain parts broken away.

Briefly, the above and related objects are attained by the continuous operation of (a) feeding thermoplastic resin particles and a foaming agent simultaneously to a mixing chamber, (b) admixing mechanically said resin particles and said foaming agent while simultaneously and mechanically advancing said admixture to the discharge end of the mixing chamber, and (c) discharging dry, free-flowing foamable thermoplastic resin particles from the mixing chamber directly to an extruder in which the foamable resin particles are extruded into a foamed thermoplastic resin structure.

As illustrated in FIG. 1, there is provided a cylindrical housing 10 having therein a chamber 11. Mounted axially within chamber 11 is a rotatable shaft 12 to which is attached a continuous clockwise helical blade 14, and an interrupted counter-clockwise helical blade 15. Helical blades 14 and 15 are supported by support rods 17 which are transversely attached to said helical blades and rotatable shaft 12. Only a few of said support rods 17 are shown. Power driving means (not shown) are employed for positively rotating shaft 12. An end plate 16 completely seals the rear end of cylindrical housing 10 except for the necessary opening through which rotatable shaft 12 is mounted on suitable bearings (not shown).

The forward end of cylindrical housing 10 is sealed by end plates 19 and 20, which end plates include a common discharge orifice 18. The available cross-sectional area of discharge orifice 18 can be controlled by a plate 22, which is slideably mounted between end plates 19 and 20 and which can be moved up or down in the same vertical plane as orifice 18. Plate 22 has therein bore 23 through which may be attached a pulling device such as a line (not shown) for purposes of positioning plate 22 by raising or lowering said plate, thereby making available any desired cross-sectional area of discharge orifice 18. Externally attached to and integral with end plate 20 is a discharge spout 24 which encompasses discharge orifice 18 and which communicates with a hopper 26 of a screw extruder 28.

Associated with cylindrical housing 10 and externally attached thereto is feed hopper 30 which communicates directly with chamber 11 by means of a channel 31 within a housing member 34, and an orifice 32. A plate 33 is slideably mounted in housing member 34 and extends into channel 31 to control the flow of resin particles from hopper 30 into chamber 11. Also provided in housing 10 is an orifice 35 which communicates directly with chamber 11. Externally attached to housing 10 and circumferentially mounted around orifice 35 is a conically shaped tube 36, through which is charged a foaming agent.

Screw extruder 28 has associated therewith feed hopper 26 and an internal screw 38. Attached to screw extruder 28 is a die head 40 having therein a die orifice 41, a die mandrel 42 and an air injection tube 44.

In operating the embodiment of the invention illustrated in FIG. 1, thermoplastic resin particles 8—8, such as essentially spherical polystyrene particles, having an average diameter of about 500–700 microns, are charged to hopper 30 and fall by gravity directly into chamber 11 through channel 31 and orifice 32. The rate at which particles 8—8 are fed into chamber 11 is controlled by sliding plate 33 into or out of channel 31. Simultaneously therewith, foaming agent 9—9, such as a mixture of 90% pentane and 10% acetone for example, is metered into chamber 11 in the form of a spray through tube 36 and orifice 35. The foaming agent 9—9 and resin particles 8—8 are charged to chamber 11 in the weight ratio of 3–10 parts of foaming agent per 100 parts of resin particles. Power means (not shown) rotate shaft 12 in a counter-clockwise direction, and as shaft 12 is rotated, helical blade 14 will advance the charged resin particles toward discharge orifice 18. Interrupted helical blade 15 will simultaneously retard this forward motion by moving a portion of the charged resin particles in the opposite direction. This opposed movement so introduced by helical blade 15 will cause a tumbling action of the resin particles and foaming agent thereby providing for intimate contact of the resin particles with the foaming agent. However, the net overall movement of the resin particles is towards discharge orifice 18. This intimate contact provided by the tumbling action insures essentially complete association of the foaming agent with the thermoplastic resin particles. The foaming agent so employed will first uniformly coat the resin particles and then quickly diffuse into the said resin particles so as to produce free-flowing and essentially dry foamable thermoplastic resin particles 13—13. The foamable resin particles 13—13 are then directed by spout 24 into feed hopper 26 of screw extruder 28. The resin particles are melted in the melt zone of screw extruder 28 (heating means not shown) and the mass advanced to die head 40 by means of screw 38. The mass is extruded through die orifice 41, into a foamed tubular film 43. Air is injected through tube 44 to form an air pocket 46 of a selected volume within the tubular film. The tubular film is progressively flattened by rolls 48—48 before passing between squeeze rolls 50—50 which serve to complete the flattening of tubular film 43.

During the initial start-up, the operating conditions of feed rate of the resin particles and foaming agent, of shaft speed and of discharge orifice opening can be varied so as to produce a continuous flow of essentially dry foamable resin particles 13—13 from discharge spout 24 to extruder feed hopper 26. Initially, discharge orifice 18 may be wholly sealed by plate 22. Then as the foaming agent and resin particles are charged to the mixing chamber and as shaft 12 is rotated, discharge orifice 18 may be opened periodically to check the condition of the foamable resin particles discharge therefrom. If the resin particles are not dry and free-flowing, the rate of feed of the component parts and the speed of shaft rotation can be varied to obtain the proper dry foamable resin particles. In addition, discharge orifice 18 may be left wholly or partially open in order to obtain a slightly longer residence time of the particles to insure proper mixing of the resin particles and foaming agent.

The following examples are set forth to illustrate more clearly this invention and are not intended to limit the scope of the present invention. Unless otherwise stated, all parts are parts by weight.

*Example I*

After starting up the apparatus as previously described, essentially spherical styrene homopolymer particles having an average diameter of about 900–1000 microns are charged to chamber 11 from hopper 30 at a rate of about 46 lbs./hr. About 1% of finely-divided calcium silicate is admixed with the polystyrene resin particles to reduce the cell size of the foamed resin subsequently produced. A liquid foaming agent, consisting of about 90% pentane and about 10% acetone, is metered through conical tube 36 to mixing chamber 11 at the rate of about 4 lbs./hr.

The rotation of shaft 12 and the opening of discharge orifice 18 are so adjusted as to allow a flow of dry foamable resin particles from discharge tube 24 into extruder feed hopper 26 at the rate of about 50 lbs./hr. The average residence time for any given particle in chamber 11 is about 25–30 minutes. These conditions of operation permit the foaming agent to first uniformly coat and then diffuse into the polystyrene particles. The foamable resin particles are then extruded through screw extruder 28 at a rate of about 50 lbs./hr. and at a die temperature of about 312–316° F.

The extruded foamed resin has a density of about 5.3 lbs./cu. ft. and has an average cell diameter of about 0.04 inch. The foam stiffens on standing, indicating rapid diffusion of the acetone from the foamed material.

*Example II*

Example I is repeated except that the styrene homopolymer particles employed have an average diameter of about 200–300 microns. Because of the smaller particle size, the foaming agent more quickly diffuses into the resin particles thus permitting a shorter average residence time for any given particle. The residence time in this example is about 10–15 minutes. The shaft speed and the discharge orifice opening are adjusted to permit a flow of about 50 lbs./hr. of essentially dry foamable styrene resin particles into extruder feed hopper 26.

The extruded foamed styrene resin has a density of about 5.0 lbs./cu. ft. and has an average cell diameter of about 0.02 inch. The uniformity of the cell structure is satisfactory, showing a quality product.

The present invention is directed to a continuous process for preparing an extruded foamed thermoplastic resin and to the apparatus employed therewith. The continuous process comprises (*a*) continuously bringing into intimate contact 100 parts by weight of thermoplastic resin particles having an average particle size of 200–1200 microns and 3–10 parts by weight of a foaming agent, (*b*) continuously admixing said thermoplastic resin particles and foaming agent for a sufficient period of time so as to produce dry, free-flowing foamable thermoplastic resin particles, (*c*) continuously transferring the foamable thermoplastic resin particles to an extruder, and (*d*) continuously extruding said foamable thermoplastic resin particles, the rates of (*a*), (*c*) and (*d*) being essentially identical. The foaming agent employed consists essentially of (1) a volatile non-reactive organic compound having an atmospheric boiling point in the range of about —10° C. to about 80° C. and having at most a slight solvent action on the thermoplastic resin particles, and (2) mixtures consisting predominantly of (1) with small amounts of an organic compound having a solvent action on the thermoplastic resin particles employed therein.

It is recognized that the continuous admixing of the thermoplastic particles and foaming agent should be for a sufficient period of time so as to produce dry, free-flowing foamable thermoplastic particles. This time of admixing is dependent upon the size of the thermoplastic particles, the foaming agent employed and the speed of continuously admixing the materials.

The extrusion may be carried out at temperatures ranging from 250° F. to about 400° F., depending upon the softening temperature of the foamable thermoplastic resin employed therein. For example, temperatures in the range of 300–330° F. are found to be suitable for extruding foamable polystyrene polymers by the present method. The pressure within the extruder can range from about 400 p.s.i. to about 3000 p.s.i.

The thermoplastic resins which can be employed in the practice of this invention include cellulose ethers and esters, e.g., ethyl cellulose, cellulose acetate, cellulose nitrate, cellulose butyrate; homopolymers and interpolymers of monomeric compounds containing the vinylidene grouping $CH_2=C<$ such as vinyl halides, e.g., vinyl chloride, vinyl bromide; vinylidene chloride; olefins, e.g., ethylene, propylene, isobutylene; vinyl esters of carboxylic acids, e.g., vinyl acetate, vinyl propionate, vinyl benzoate; vinyl ethers, e.g., vinyl methyl ether, vinyl isobutyl ether; unsaturated carboxylic acids and derivatives thereof, e.g., acrylic acid, methacrylic acid, acrylic acid and methacrylic acid esters of alcohols containing 1–18 carbon atoms such as methyl and ethyl methacrylate, acrylamide, methacrylamide, methacrylonitrile, acrylonitrile; vinyl aromatic compounds, e.g., styrene, alpha-methylstyrene, vinyl toluenes, p-ethylstyrene, 2,4-dimethylstyrene, o-chlorostyrene, 2,5-dichlorostyrene, vinyl naphthalene; and interpolymers, of vinylidene monomers of the above type with alpha, beta-unsaturated polycarboxylic acids and derivatives thereof, e.g., maleic anhydride, diethyl maleate, dibutyl fumarate, etc. It may be feasible and desirable to employ blends of two or more thermoplastic resins such as blends of styrene polymers with rubbery diene polymers such as natural rubber, butadiene-styrene interpolymers, butadiene-acrylonitrile interpolymers and the like. Styrene graft copolymers prepared by polymerizing monomeric styrene, either alone or in admixture with other vinylidene monomers such as acrylonitrile, in the presence of a rubbery diene polymer may also be employed advantageously. The preferred thermoplastic resins to be employed in the practice of this invention are styrene homopolymers and styrene interpolymers containing at least 50% by weight of styrene and up to 50% by weight of a vinylidene monomer interpolymerizable therewith, e.g., butadiene, acrylonitrile, alpha-methylstyrene and the like.

The average particle size of the thermoplastic resins employed can vary from 200 to 1200 microns with the preferred range being 400–700 microns. The smaller the particle size, the quicker is the diffusion of the foaming agent into the resin particles. However, it is recognized that although an extremely fine particle size of generally less than 200 microns will provide even faster diffusion rates for the foaming agent, it will generally carry with it the problems associated with dusting. Thus as a practical matter, 200 microns is a satisfactory practical lower limit. By "particle size in microns," it is meant that dimension which is the largest of any given thermoplastic resin particle.

As previously stated, the foaming agent employed in the practice of this invention consists essentially of a volatile non-reactive organic compound having an atmospheric boiling point in the range of about —10° C. to about 80° C. and having at most a slight solvent action on the thermoplastic resin particles included in this invention. Examples of volatile non-reactive organic compounds, which may be employed as a foaming agent, are the aliphatic hydrocarbons such as butane, isobutane, pentane, hexane, isohexane, cyclohexane, etc.; certain halogenated aliphatic hydrocarbons such as ethyl chloride, propyl chloride, butyl chloride, and isopropyl bromide and particularly the perchlorofluorocarbons such as dichlorodifluoromethane, monochlorotrifluoromethane, trichloromonofluoromethane, 1,1,2,2-tetrachloro-1,2-difluoroethane, and the corresponding perchlorofluorocarbons as set forth in U.S. 2,848,428; aliphatic amines such as ethylamine, propylamine, isopropylamine, butylamine, dimethylamine, diethylamine, etc.; aliphatic ethers such as diethyl ether, di-isopropyl ether, methyl ethyl ether, ethyl isopropyl ether, etc.; acetaldehyde, etc. For a listing of other volatile foaming agents that can be employed see U.S. 2,681,321.

It is feasible and in some cases desirable to employ mixtures as the volatile foaming agent wherein the mixtures consist predominantly of a volatile non-reactive organic foaming agent of the type described above with minor amounts of an organic compound having a solvent action on the thermoplastic resin particles. Typically, such mixtures will contain 70–99% by weight of the volatile non-reactive organic foaming agent and, correspondingly, 30–1% by weight of the organic compound having a solvent action on the thermoplastic resin particles. Typical of the organic compounds having such a solvent action and which can be employed in the admixtures with a volatile non-reactive organic foaming agent are acetone, methylene chloride, styrene monomer, benzene, xylene, carbon tetrachloride, chloroform, etc. Preferably, the organic solvent should not have a boiling point higher than about 80° C. The preferred foaming agent to be employed in the practice of this invention is a mixture of about 85–95% pentane and about 5–15% acetone on a weight basis.

The foamed resin extrusion apparatus employed in the present invention comprises in combination (a) a screw extruder that is charged directly from a feed hopper, and (b) a mixer which discharges its contents directly into the feed hopper of the extruder. The mixer comprises in combination (1) a mixing chamber, (2) means for continuously charging thermoplastic resin particles to said mixing chamber, (3) means for continuously charging a foaming agent to said mixing chamber, (4) means for continuously admixing the resin particles and foaming agent within said mixing chamber, (5) means for continuously advancing the admixture to the discharge end of said mixing chamber, and (6) means for continuously transferring the admixture directly from the discharge end of the mixing chamber to the feed hopper of the extruder.

It will thus be seen that the objects set forth above, among those made apparent from the preceding description are efficiently attained, and since certain changes may be made in carrying out the above process and in the compositions set forth without departing from the scope of the invention, it is intended that all matters contained in the above description shall be interpreted as illustrative and not in a limiting sense.

What is claimed is:

1. A continuous process for preparing an extruded foamed thermoplastic resin which comprises (a) continuously bringing into intimate contact 100 parts by weight of thermoplastic resin particles having an average particle size of 200–1200 microns and 3–10 parts by weight of a foaming agent, (b) continuously admixing said thermoplastic resin particles and foaming agents for a sufficient period of time so as to produce dry, free-flowing foamable thermoplastic resin particles, (c) continuously transferring the foamable thermoplastic resin particles to an extruder, and (d) continuously extruding said foamable thermoplastic resin particles; the rates of (a), (c) and (d) being essentially identical; said foaming agent consisting essentially of (1) a volatile non-reactive organic compound having an atmospheric boiling point in the range of about —10° C. to about 80° C. and having at most a slight solvent action on the thermoplastic resin particles, and (2) mixtures consisting predominantly of (1) with small amounts of an organic compound having a solvent action on the thermoplastic resin particles employed therein.

2. The process described in claim 1 wherein the process comprises (a) feeding the finely-divided thermoplastic resin particles and the foaming agent to an elongated cylindrical mixing zone, (b) subjecting said resin particles and foaming agent to agitation to uniformly coat the resin particles with foaming agent, (c) mechanically moving said foaming agent coated resin particles towards the discharge end of the mixing zone and discharging a portion of the resin particles from the mixing zone directly into the feed hopper of an extruder, (d) mechanically moving a portion of said foaming agent coated resin particles away from the discharge end of the mixing zone, the relative rates of movement of said foaming agent coated resin particles towards and away from the discharge end of the mixing zone being such that (1) there is a net flow of resin particles toward the discharge end of the mixing zone and (2) the average residence time of the resin particles in the mixing zone is at least 29 minutes, and (e) extruding the foaming agent coated resin particles that are discharged into the feed hopper of the extruder; the rate of feed of resin particles and foaming agent to the mixing zone, the rate of discharge of the foaming agent coated resin particles from the mixing zone to the extruder feed hopper and the rate of extrusion of the foaming agent coated resin particles being substantially identical.

3. The process described in claim 1 wherein the thermoplastic resin particles are selected from the group consisting of styrene homopolymers and styrene interpolymers which have polymerized therein at least 50% by weight of styrene.

4. The process described in claim 1 wherein the thermoplastic resin is selected from the group consisting of vinyl halide homopolymers and vinyl halide interpolymers which have polymerized therein at least 50% by weight of a vinyl halide.

5. The process described in claim 1 wherein the foaming agent is comprised of about 85–95% by weight of pentane and about 5–15% by weight of acetone.

6. A foamed resin extrusion apparatus comprising in combination (a) a screw extruder that is charged directly from a feed hopper, and (b) a mixer which discharges its contents directly into the feed hopper of the extruder; said mixer comprising (1) a mixing chamber, (2) means for continuously charging thermoplastic resin particles to said mixing chamber, (3) means for continuously charging a foaming agent to said mixing chamber, (4) means for continuously admixing the thermoplastic resin particles and foaming agent within said mixing chamber, (5) means for continuously advancing the admixture to the discharge end of said mixing chamber, and (6) means for continuously transferring the admixture directly from the discharge end of the mixing chamber to the feed hopper of the extruder.

7. The apparatus described in claim 6 wherein said mixer comprises in combination (a) an elongated horizontal cylindrical mixing chamber having a discharge port in one end thereof, (b) means for feeding solid particles to the mixing chamber, (c) means for feeding a foaming agent to the mixing chamber, both the particle and the foaming agent feeding means being located a considerable distance up-stream from the discharge port, (d) a rotatable shaft centrally located within and extending throughout the mixing chamber, (e) a continuous helical blade carried by said rotatable shaft, and (f) an interrupted helical blade carried by said rotatable shaft; said continuous and interrupted helical blades having an opposed movement with the resulting net flow of solid particles being toward the discharge port when the shaft is rotated.

8. The apparatus described in claim 6 wherein the screw extruder is fitted with a tubular blow film extrusion die.

9. The apparatus described in claim 6 wherein the screw extruder is fitted with a sheet extrusion die.

References Cited in the file of this patent

UNITED STATES PATENTS

| | | |
|---|---|---|
| 2,442,940 | Standinger et al. | June 8, 1948 |
| 2,530,503 | Bonham | Nov. 21, 1950 |
| 2,576,977 | Stober | Dec. 4, 1951 |
| 2,680,880 | Corbett | June 15, 1954 |
| 2,744,291 | Stastny et al. | May 8, 1956 |
| 2,848,428 | Rubens | Aug. 19, 1958 |
| 2,857,341 | Colwell et al. | Oct. 21, 1958 |
| 2,857,342 | Platzer | Oct. 21, 1958 |

FOREIGN PATENTS

| | | |
|---|---|---|
| 1,180,049 | France | Dec. 29, 1958 |